United States Patent
Pan et al.

(10) Patent No.: US 12,173,945 B2
(45) Date of Patent: Dec. 24, 2024

(54) CARBON DIOXIDE OVERLAPPING TYPE HEATING SYSTEM, AND CONTROL METHOD THEREFOR

(71) Applicant: JIANGSU SUJING GROUP CO., LTD., Jiangsu (CN)

(72) Inventors: Hao Pan, Jiangsu (CN); Xiaoliang Tang, Jiangsu (CN); Dan Xiong, Jiangsu (CN); Jun You, Jiangsu (CN); Qiang Kang, Jiangsu (CN); Xiaofei Song, Jiangsu (CN)

(73) Assignee: Jiangsu Sujing Group Co., Ltd., Jiangsu (CN)

( * ) Notice: Subject to any disclaimer, the term of this patent is extended or adjusted under 35 U.S.C. 154(b) by 283 days.

(21) Appl. No.: 17/756,412

(22) PCT Filed: Dec. 3, 2019

(86) PCT No.: PCT/CN2019/122562
§ 371 (c)(1),
(2) Date: May 24, 2022

(87) PCT Pub. No.: WO2021/103053
PCT Pub. Date: Jun. 3, 2021

(65) Prior Publication Data
US 2022/0412609 A1 Dec. 29, 2022

(30) Foreign Application Priority Data
Nov. 28, 2019 (CN) .......................... 201911189938.1

(51) Int. Cl.
*F25B 7/00* (2006.01)
*F24D 19/10* (2006.01)
(Continued)

(52) U.S. Cl.
CPC ............ *F25B 7/00* (2013.01); *F24D 19/1039* (2013.01); *F25B 9/008* (2013.01); *F25B 49/022* (2013.01);
(Continued)

(58) Field of Classification Search
CPC ............ F25B 2400/05; F25B 2400/054; F25B 2313/02334; F25B 2600/112; F25B 2600/13; F25B 2600/19
See application file for complete search history.

(56) References Cited

U.S. PATENT DOCUMENTS

2002/0170302 A1* 11/2002 Bagley .................. F25B 47/006
62/196.4
2006/0086103 A1* 4/2006 Lee .......................... F24F 11/30
62/126
(Continued)

FOREIGN PATENT DOCUMENTS

| CN | 104048347 A | 9/2014 |
| CN | 203824164 U | 9/2014 |

(Continued)

OTHER PUBLICATIONS

International Search Report and Written Opinion issued for International Patent Application No. PCT/CN2019/122562, dated Jun. 11, 2020 in 14 pages including English translation.

*Primary Examiner* — Jerry-Daryl Fletcher
*Assistant Examiner* — Daniel C Comings
(74) *Attorney, Agent, or Firm* — Knobbe, Martens, Olson & Bear, LLP

(57) ABSTRACT

A carbon dioxide overlapping type heating system and a control method therefor, in which the heating system includes a low-temperature-stage loop, high-temperature-stage loop and a heating loop, in which a temperature-stage compressor (3) and a high-temperature-stage compressor (7)
(Continued)

Figure 1:
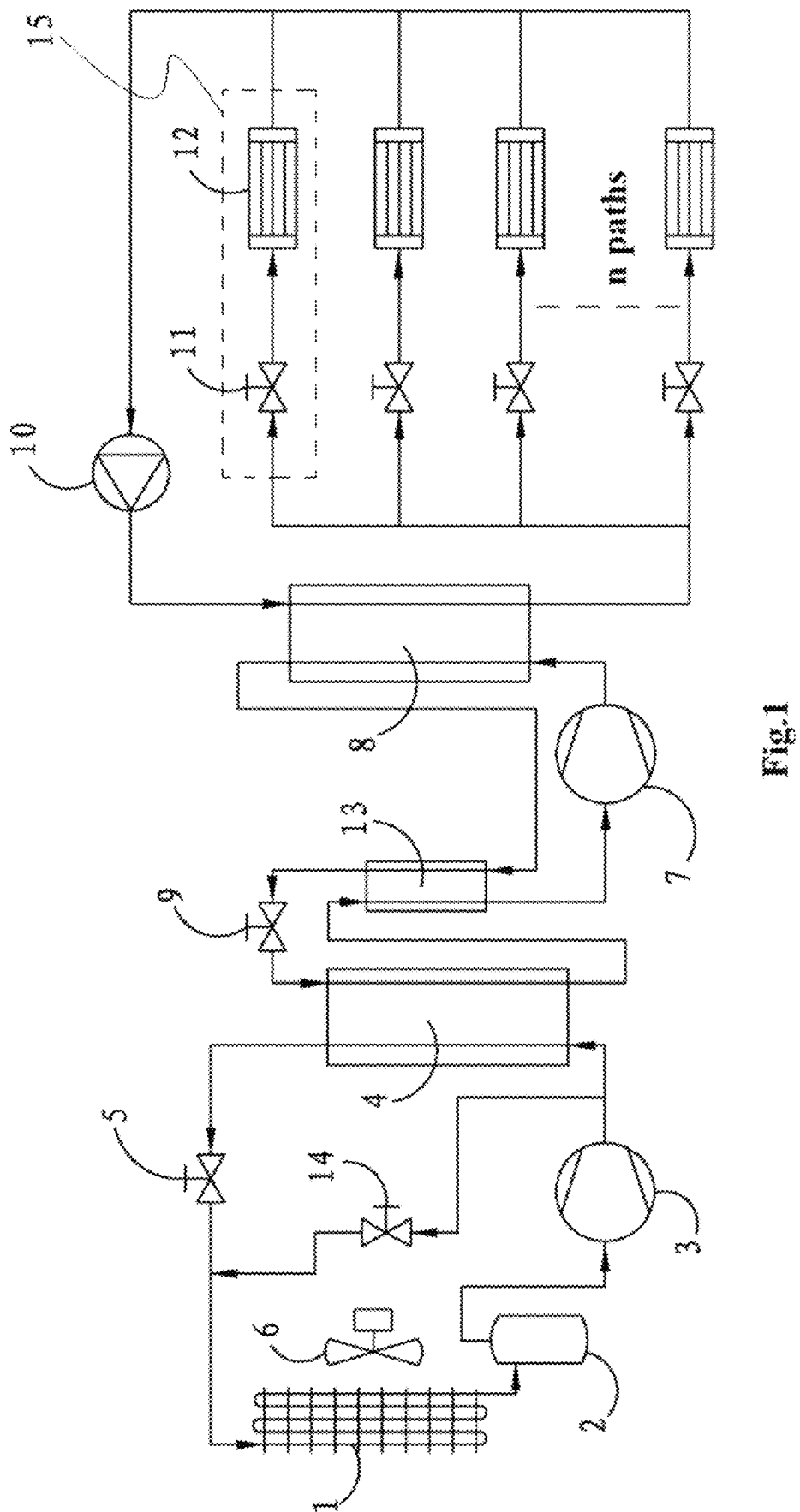

are both variable-frequency compressors; and a water pump (10) is a variable-frequency water pump.

9 Claims, 2 Drawing Sheets

(51) Int. Cl.
*F25B 9/00* (2006.01)
*F25B 49/02* (2006.01)
(52) U.S. Cl.
CPC ... *F25B 2600/0253* (2013.01); *F25B 2600/11* (2013.01); *F25B 2600/13* (2013.01); *F25B 2600/19* (2013.01)

(56) References Cited

U.S. PATENT DOCUMENTS

| | | | |
|---|---|---|---|
| 2013/0227976 A1* | 9/2013 | Yamashita | F25B 25/005 62/126 |
| 2016/0272049 A1* | 9/2016 | Renken | B60P 3/20 |
| 2019/0047363 A1* | 2/2019 | Sonnekalb | B60H 1/00371 |

FOREIGN PATENT DOCUMENTS

| | | |
|---|---|---|
| CN | 205783233 U | 12/2016 |
| CN | 108759144 A | 11/2018 |
| CN | 210605494 U | 5/2020 |
| WO | WO-2018193498 A1 * | 10/2018 ............... F25B 1/00 |

* cited by examiner

CARBON DIOXIDE OVERLAPPING TYPE HEATING SYSTEM, AND CONTROL METHOD THEREFOR

CROSS-REFERENCES TO RELATED APPLICATIONS

This application is the U.S. National Phase under 35 U.S.C. § 371 of International Application PCT/CN2019/122562, filed Dec. 3, 2019, which is hereby incorporated by reference in its entirety and which claims priority to Chinese Patent Application No. 201911189938.1, filed Nov. 28, 2019.

FIELD OF TECHNOLOGY

The present disclosure relates to a carbon dioxide overlapping type heating system and control method therefor.

BACKGROUND

As refrigerants, carbon dioxide and R1234yf (2,3,3,3-tetrafluoropropene) both have good environmental attributes such as ODP (Ozone Depletion Potential) of 0 and low GWP (Global Warming Potential), wherein the new refrigerant R1234yf as a substitute for the refrigerant R134a with high greenhouse effect (1,1,1,2-tetrafluoroethane), has been used on a certain scale in automotive air conditioners, and carbon dioxide as a natural working medium also has good physical properties under low-temperature conditions. Therefore, comparing with the traditional overlapping type heat pump, the carbon dioxide overlapping type heating system formed by combining the two has good performance and balances environmental attributes. The current carbon dioxide overlapping type heating system cannot adjust the load of the machine set according to the change of the ambient temperature and the indoor temperature with human comfort as the control target, nor can adjust the loads of the high temperature stage and the low temperature stage under this working condition to ensure the optimal operation of the machine set.

SUMMARY

The purpose of the present disclosure is to provide a carbon dioxide overlapping type heating system and a control method therefor.

To achieve the above purpose, the technical solution employed by the present disclosure is:

a carbon dioxide overlapping type heating system comprises a low-temperature-stage loop, a high-temperature-stage loop and a heating loop, wherein the low-temperature-stage loop comprises an evaporator, a gas-liquid separator, a low-temperature-stage compressor, an intermediate heat exchanger condensing pipe and a low-temperature-stage expansion valve which are arranged in series in the loop sequentially; the high-temperature-stage loop comprises an intermediate heat exchanger evaporating pipe, a high-temperature-stage compressor, a condenser condensing pipe and a high-temperature-stage expansion valve which are arranged in series in the loop sequentially; the heating loop comprises a condenser evaporating pipe, a user-side heat exchange assembly and a water pump which are arranged in series in the loop sequentially; the intermediate heat exchanger condensing pipe and the intermediate heat exchanger evaporating pipe are arranged together to exchange heat with each other, and the condenser condensing pipe and the condenser evaporating pipe are arranged together to exchange heat with each other, the low-temperature-stage compressor and high-temperature-stage compressor are both variable-frequency compressors, and the water pump is a variable-frequency water pump.

Preferably, it further comprises an ambient temperature sensor for detecting the external ambient temperature, an indoor temperature sensor for detecting the indoor temperature, and a refrigerant inlet temperature sensor and a refrigerant outlet temperature sensor respectively arranged at an inlet end and an outlet end of the condenser condensing pipe.

Preferably, the high-temperature-stage loop further comprises an internal heat exchanger evaporating pipe arranged between the intermediate heat exchanger condensing pipe and the high-temperature-stage compressor, and an internal heat exchanger condensing pipe arranged between the condenser evaporating pipe and the high-temperature-stage expansion valve, and the internal heat exchanger evaporating pipe and the internal heat exchanger condensing pipe are arranged together to exchange heat with each other.

Preferably, a defrosting pipeline is connected between the inlet end of the evaporator and the inlet end of the intermediate heat exchanger condensing pipe, and the defrosting pipeline is provided with a solenoid valve.

Preferably, the user-side heat exchange assembly comprises multiple groups of user-side heat exchange units arranged in parallel, and the user-side heat exchange unit comprises a flow control valve and a user-side heat exchanger arranged in series.

Preferably, the low-temperature-stage loop further comprises a fan for driving outdoor air to exchange heat with the evaporator, and the fan is a variable-frequency fan.

A method for controlling a carbon dioxide overlapping type heating system, using the above-mentioned carbon dioxide overlapping type heating system, comprises the following steps:

1) calculating the target temperature $T_{s,i}$ of an i-th room according to room information, obtaining the outdoor temperature $T_a$ through an ambient temperature sensor, and obtaining the indoor temperature $T_{t,i}$ of the i-th room through an indoor temperature sensor;
2) calculating the temperature $T_{out}=(T_{t,1}, T_{t,2}, \ldots, T_{t,n}, T_{Ss1}, T_{s,2}, \ldots T_{s,n})$ required for a secondary refrigerant in the outlet of a condenser through $T_{s,i}$, $T_a$ and $T_{t,i}$, and calculating the heat load $Q_i=\phi_i(T_{t,i}, T_{s,i}, T_a)$ required for the i-th room;
3) calculating an appropriate opening degree $EXP_i=EXP_i(\Delta T_i, Q_i)$ of an i-th flow control valve according to the difference $\Delta T_i$ between the current temperature $T_{t,i}$ and the target temperature $T_{s,i}$ of the i-th room and the heat load $Q_i$, and adjusting the flow control valve according to the numerical value of $EXP_i$;
4) calculating the heating capacity $Q=\Sigma_i^n Q_i + Q_s$ provided by a heating unit according to the heat load $Q_i$ required for the i-th room and the loss of heat leak Qs during the heating process of the user-side heat exchange unit;
5) according to the heating capacity Q provided by the heating unit and the outlet temperature Tout required for refrigerating medium at the outlet of a condenser, adjusting an appropriate operating frequency $V_1=g(Q, T_{out})$ of the high-temperature-stage compressor and an appropriate operating frequency $V_3=h(Q, T_{out})$ of the water pump by formula:

$$V_1=g(Q,T_{out})=50+5*Q/Q_o+3*T_{out}/T_{out,0},$$

$$V_3=h(Q,T_{out})=1250*Q/[Q_o*(T_{out}-40)];$$

6) adjusting an appropriate operating frequency $V_2=m(T_m, T_a)$ of the low-temperature-stage compressor by formula according to a target intermediate temperature $T_m$ and the ambient temperature $T_a$:

$$V_2=m(T_m,T_a)=45.27-0.65*T_a+0.254*T_m-0.003*T_a^2+0.0017*T_m^2+0.0019*T_a*T_m;$$

7) adjusting the high-temperature-stage compressor according to the numerical value of $V_1$, adjusting the low-temperature-stage compressor according to the numerical value of $V_2$, and adjusting the water pump according to the numerical value of $V_3$.

A method for controlling a carbon dioxide overlapping type heating system, using the above-mentioned carbon dioxide overlapping type heating system, comprises the following steps:

1) calculating the comfortable temperature $T_{s,i}$ of an i-th room according to room information, obtaining the outdoor temperature $T_a$ through an ambient temperature sensor, and obtaining the indoor temperature $T_{t,i}$ of the i-th room through an indoor temperature sensor;
2) calculating the temperature $T_{out}=(T_{t,1}, T_{t,2}, \ldots, T_{t,n}, T_{s,1}, T_{s,2}, \ldots, T_{s,n})$ required for a secondary refrigerant in the outlet of a condenser through $T_{s,i}$, $T_a$ and $T_{t,i}$, and calculating the heat load $Q_i=\phi_i(T_{t,i},T_{s,i},T_a)$ required for the i-th room;
3) calculating an appropriate opening degree $EXP_i=EXP_i(\Delta T_i,Q_i)$ of an i-th flow control valve according to the difference $\Delta T_i$ between the current temperature $T_{t,i}$ and the comfortable temperature $T_{s,i}$ of the i-th room and the heat load $Q_i$, and adjusting the flow control valve according to the numerical value of $EXP_i$;
4) calculating the heating capacity $Q=\Sigma_i^n Q_i+Q_s$ provided by a heating unit according to the heat load $Q_i$ required for the i-th room and the loss of heat leak $Q_s$ during the heating process of the user-side heat exchange unit;
5) according to the heating capacity Q provided by the heating unit and the outlet temperature $T_{out}$ required for refrigerating medium at the outlet of a condenser, adjusting an appropriate operating frequency $V_1=g(Q, T_{out})$ of the high-temperature-stage compressor and an appropriate operating frequency $V_3=h(Q,T_{out})$ of the water pump by formula:

$$V_1=g(Q,T_{out})=50+5*Q/Q_o+3*T_{out}/T_{out,0},$$

$$V_3=h(Q,T_{out})=1250*Q/[Q_o*(T_{out}-40)];$$

6) adjusting an appropriate operating frequency $V_2=m(T_m,T_a)$ of the low-temperature-stage compressor by formula according to a target intermediate temperature $T_m$ and the ambient temperature $T_a$:

$$V_2=m(T_m,T_a)=45.27-0.65*T_a+0.254*T_m-0.003*T_a^2+0.0017*T_m^2+0.0019*T_a*T_m;$$

7) adjusting the high-temperature-stage compressor according to the numerical value of $V_1$, adjusting the low-temperature-stage compressor according to the numerical value of $V_2$, and adjusting the water pump according to the numerical value of $V_3$.

Preferably, a method for controlling the operation of the fan is:
when $T_a \leq T_{a,1}$, the variable-frequency fan runs at an operating frequency of $V_{f,1}$;
when $T_{a,1} < T_a \leq T_{a,2}$, the variable-frequency fan runs at an operating frequency of $V_{f,2}$;
when $T_a > T_{a,2}$, the variable-frequency fan runs at an operating frequency of $V_{f,3}$;
wherein, $V_{f,1} > V_{f,2} > V_{f,3}$.

Preferably, in step 3), when $|\Delta T_i| \leq 1°$ C., the i-th flow control valve is no longer adjusted.

Due to the use of the above technical solutions, the present disclosure has the following advantages over the prior art:

Because the carbon dioxide overlapping type heating system of the present disclosure adopts variable-frequency compressors, a variable-frequency water pump, and a variable-frequency fan, it has the characteristics of high efficiency, energy conservation and green issues, and the control method therefor can reasonably adjust its operating parameters and ensure it runs in the highest efficient state according to the heat load demand at the user side, so as to save energy, improve heating comfort, and improve the deficiencies of the existing carbon dioxide overlapping type heating system.

BRIEF DESCRIPTION

Figure 2:
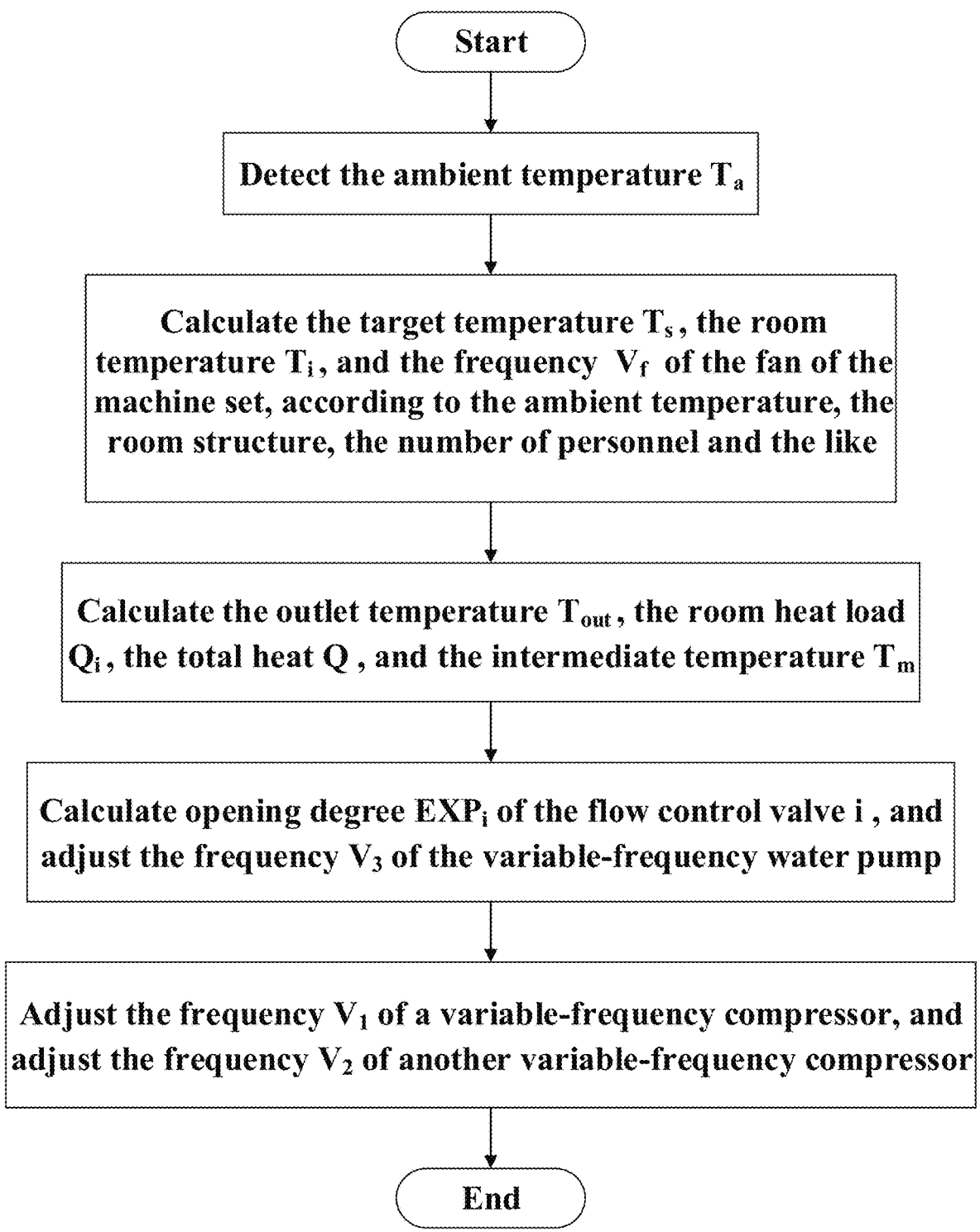

FIG. 1 is a system principle diagram of the present disclosure;
FIG. 2 is a control flow diagram of the present disclosure.

In figures: 1, evaporator; 2, gas-liquid separator; 3, low-temperature-stage compressor; 4, intermediate heat exchanger; 5, low-temperature-stage expansion valve; 6, variable-frequency fan; 7, high-temperature-stage compressor; 8, condenser; 9, high-temperature-stage expansion valve; 10, water pump; 11, flow control valve; 12, user-side heat exchanger; 13, internal heat exchanger; 14, solenoid valve; 15, user-side heat exchange unit.

DETAILED DESCRIPTION

In the following, the present disclosure is further described in detail combining with specific embodiments shown in the accompanying drawings.

Referring to FIG. 1, a carbon dioxide overlapping type heating system comprises a low-temperature-stage loop, a high-temperature-stage loop and a heating loop, wherein the low-temperature-stage loop comprises an evaporator 1, a gas-liquid separator 2, a low-temperature-stage compressor 3, an intermediate heat exchanger condensing pipe and a low-temperature-stage expansion valve 5 which are arranged in series in the loop sequentially, wherein the evaporator 1 is provided with a variable-frequency fan 6, in this embodiment, carbon dioxide is used as the medium in the low-temperature-stage loop. The high-temperature-stage loop comprises an intermediate heat exchanger evaporating pipe, a high-temperature-stage compressor 7, a condenser condensing pipe and a high-temperature-stage expansion valve 9 which are arranged in series in the loop sequentially, in this embodiment, R1234yf is used as the medium in the high-temperature-stage loop. The heating loop comprises a condenser evaporating pipe, a user-side heat exchange assembly and a water pump 10 which are arranged in series in the loop sequentially. The intermediate heat exchanger condensing pipe and the intermediate heat exchanger evaporating pipe are arranged together to exchange heat with each other to form an intermediate heat exchanger 4, and the condenser condensing pipe and the condenser evaporating pipe are arranged together to exchange heat with each other to form a condenser 8. In this embodiment, the low-temperature-stage compressor 3 and high-temperature-stage compressor 7 are both variable-frequency compressors, and the water pump 10 is a variable-frequency water pump 10. In addition, the user-side heat exchange assembly comprises multiple groups of user-side heat exchange units arranged in parallel, and the user-side heat exchange unit 15 comprises a flow control valve 11 and a user-side heat exchanger 12 arranged in series.

Furthermore, it further comprises an ambient temperature sensor for detecting the external ambient temperature, an indoor temperature sensor for detecting the indoor temperature, and a refrigerant inlet temperature sensor and a refrigerant outlet temperature sensor respectively arranged at an inlet end and an outlet end of the condenser condensing pipe.

In this embodiment, the high-temperature-stage loop further comprises an internal heat exchanger evaporating pipe arranged between the intermediate heat exchanger condensing pipe and the high-temperature-stage compressor 7, and an internal heat exchanger condensing pipe arranged between the condenser evaporating pipe and the high-temperature-stage expansion valve 9, and the internal heat exchanger evaporating pipe and the internal heat exchanger condensing pipe are arranged together to exchange heat with each other to form an internal heat exchanger 13. The internal heat exchanger 13 can assist the complete liquefaction of the R1234yf medium that had passed through the condenser 8 without being completely liquefied, enhancing its effect.

A defrosting pipeline is connected between the inlet end of the evaporator 1 and the inlet end of the intermediate heat exchanger condensing pipe, and the defrosting pipeline is provided with a solenoid valve 14, and when defrosting is required, the solenoid valve 14 is opened, and the carbon dioxide medium bypasses the intermediate heat exchanger 4 and returns to the evaporator 1. To prevent the carbon dioxide medium from continuing to absorb heat from the evaporator 1 during the defrosting operation, so as to postpone the defrosting effect, and at the same time ensure that other machine sets do not need to be shut down, and improve the working efficiency.

The working mode of the carbon dioxide overlapping type heating system in this embodiment is:

In the heating mode, the solenoid valve 14 is turned off, the variable-frequency fan 6, the low-temperature-stage compressor 3 and the high-temperature-stage compressor 7 are turned on, and the variable-frequency water pump 10 is turned on.

In the low-temperature-stage loop, driven by the low-temperature-stage compressor 3, the carbon dioxide medium enters the intermediate heat exchanger condensing pipe and is cooled by the R1234yf medium in the intermediate heat exchanger evaporating pipe, then enters the evaporator 1 through the low-temperature-stage expansion valve 5 to absorb heat from the air, and then enters the gas-liquid separator 2 and returns to the low-temperature-stage compressor 3.

In the high-temperature-stage-loop, driven by the high-temperature-stage compressor 7, the R1234yf medium enters the condenser condensing pipe to transfer heat to the refrigerant in the condenser condensing pipe, then enters the internal heat exchanger 13 and is further cooled by the low-temperature R12134yf, and flows through the high-temperature-stage expansion valve 9 and enters the internal heat exchanger condensing pipe to absorb heat from the carbon dioxide medium in the internal heat exchanger evaporating pipe, then enters the internal heat exchanger 13 to be further overheated and then returns to the high-temperature-stage variable-frequency compressor.

In the heating loop, driven by the variable-frequency water pump 10, the refrigerant enters the condenser evaporating pipe to absorb heat from the R1234yf medium in the condenser condensing pipe and then is divided into n paths, each of which adjusts the flow of the refrigerant through the flow control valve 11, and the refrigerant releases heat in the heat exchanger to heat the room and then re-enters the variable-frequency water pump 10.

To ensure that the variable-frequency fan 6, the low-temperature-stage compressor 3, the high-temperature-stage compressor 7 and the variable-frequency water pump 10 in the carbon dioxide overlapping type heating system can be appropriately adjusted according to the different ambient temperature and the heat load of each room, and the machine set operates at the optimal state point. Its control method comprises the following steps:

1) Calculating the target temperature $T_{s,i}$ of an i-th room according to room information, obtaining the outdoor temperature $T_a$ through the ambient temperature sensor, and obtaining the indoor temperature $T_{t,i}$ of the i-th room through the indoor temperature sensor;

2) Calculating the temperature required for the refrigerant in the outlet of the condenser 8 according to $T_{s,i}$, $T_a$ and $T_{t,i}$:

$$T_{out}=(T_{t,1},T_{t,2},\ldots T_{t,n},T_{s,1},T_{s,2},\ldots T_{s,n})=45+5(\Sigma_{i=1}^{n}(T_{s,i}-T_{t,i})-2n),$$

and calculating the heat load required for the i-th room:

$$Q_i=\phi_i(T_{t,i},T_{s,i},T_a)=A_i[K_1(T_a-T_{s,i})+K_2(T_{t,i}-T_{s,i})];$$

wherein, $K_1$ and $K_2$ are characteristic coefficients, and $A_i$ is the characteristic heating area of the i-th room.

3) Calculating an appropriate opening degree of an i-th flow control valve 11 according to the difference $\Delta T_i$ between the current temperature $T_{t,i}$ of the i-th room and the target temperature $T_{s,i}$ of the i-th room and the heat load $Q_i$:

$EXP_i=EXP_i(\Delta T_i, Q_i)=(\Delta T_i * Q_i)/a*100\%$, wherein the coefficient a is obtained by experimental data fitting, and the value is $8 \leq a \leq 10$.

And adjusting the flow control valve 11 according to $EXP_i$, only when $|\Delta T_i| \leq 1°$ C., the i-th flow control valve 11 is no longer adjusted. By appropriately adjusting each of the flow control valves 11, it can ensure that each room can be quickly reach the most target temperature.

3) Calculating an appropriate opening degree of an i-th flow control valve 11 according to the difference $\Delta T_i$ between the current temperature $T_{t,i}$ of the i-th room and the comfortable temperature $T_{s,i}$ of the i-th room and the heat load $Q_i$:

$$EXP_i=EXP_i(\Delta T_i,Q_i)=(\Delta T_i*Q_i)/a*100\%,$$

wherein the coefficient a is obtained by experimental data fitting, and the value is $8 \leq a \leq 10$.

And adjusting the flow control valve 11 according to $EXP_i$, only when $|\Delta T_i| \leq 1°$ C., the i-th flow control valve 11 is no longer adjusted. By appropriately adjusting each of the flow control valves 11, it can ensure that each room can be quickly reach the most comfortable temperature.

4) Calculating the heating capacity $Q=\Sigma_i^n Q_i + Q_s$ provided by a heating unit according to the heat load $Q_i$ required for the i-th room and the loss of heat leakage $Q_s$ during the heating process of the user-side heat exchange unit;

5) According to the heating capacity Q provided by the heating unit and the outlet temperature $T_{out}$ required for refrigerating medium in the outlet of the condenser 8, calculating an appropriate operating frequency of the high-temperature-stage compressor 7:

$$V_1=g(Q,T_{out})=50+5*Q/Q_o+3*T_{out}/T_{out,0},$$

and an appropriate operating frequency of the water pump 10:

$$V_1=h(Q,T_{out})=1250*Q/[Q_o*(T_{out}-40)],$$

and adjusting the high-temperature-stage compressor 7 according to $V_1$, adjusting the water pump 10 according to $V_3$.

6) According to an intermediate temperature $T_m$ of the intermediate heat exchanger 4 and the ambient temperature $T_a$, and according to a formula adjusting an appropriate operating frequency of the low-temperature-stage compressor 3:

$$V_2=m(T_m,T_a)=45.27-0.65*T_a+0.254*T_m-003*T_a^2+0.0017*T_m^2+0.0019*T_a*T_m;$$

adjusting the low-temperature-stage compressor 3 according to $V_2$, to ensure that the low-temperature-stage condensing temperature reaches the target intermediate temperature $T_m$. The reasonable adjustment of the low-temperature-stage compressor 3, the high-temperature-stage compressor 7 and the water pump 10 can greatly improve the working efficiency of the machine set, to reduce unnecessary energy consumption, so as to achieve the technical purpose of energy conservation.

6) According to an intermediate temperature $T_m$ of the intermediate heat exchanger 4 and the ambient temperature $T_a$, and according to a formula adjusting an appropriate operating frequency of the low-temperature-stage compressor 3:

$$V_2=m(T_m,T_a)=45.27\text{⓪}.65*T_a+0.254*T_m$$
$$\text{⓪}.003*T_a^2+0.0017*T_m^2+0.0019*T_a*T_m,$$

adjusting the low-temperature-stage compressor 3 according to $V_2$, to ensure that the low-temperature-stage condensing temperature reaches the target intermediate temperature $T_m$. The reasonable adjustment of the low-temperature-stage compressor 3, the high-temperature-stage compressor 7 and the water pump 10 can greatly improve the working efficiency of the machine set, to reduce unnecessary energy consumption, so as to achieve the technical purpose of energy conservation.

In addition, the control method further comprises the method for adjusting the fan:

when $T_a \leq T_{a,1}$, the variable-frequency fan 6 runs at the operating frequency of $V_{f,1}$;

when $T_{a,1} < T_a \leq T_{a,2}$, the variable-frequency fan 6 runs at the operating frequency of $V_{f,2}=c*T_a+b$;

when $T_a > T_{a,2}$, the variable-frequency fan 6 runs at the operating frequency of $V_{f,3}$;

wherein $V_{f,1} > V_{f,2} > V_{f,3}$, the coefficients c and b in the formula are obtained by experimental data fitting, in this embodiment, c=−4/9, b=146/3. The adjustment of the variable-frequency fan 6 can reasonably reduce the energy consumption of the variable-frequency fan 6 on the basis of satisfying the heat absorption of the evaporator 1, to further achieve the purpose of the energy conservation.

The formulas in the above-mentioned control methods can be obtained by experimental data fitting.

The carbon dioxide overlapping type heating system and the control method therefor can reasonably adjust the operating frequencies of the fan and the compressors according to the operating heating load, the heating rate is fast, and the energy is saved; and it can run in the best state when work under different working conditions, the system efficiency is high, and the purpose of saving energy is realized.

Due to that the carbon dioxide overlapping type heating system in this embodiment adopts variable-frequency compressors, a variable-frequency water pump, and a variable-frequency fan, it has the characteristics of high efficiency, energy conservation and green issues. The control method it adopts can appropriately adjust the operating frequencies of the water pump 10, the low-temperature-stage compressor 3 and the high-temperature-stage compressor 7, and the opening degree of the flow control valve 11, according to the heat load demand at the user side, to ensure it runs in the highest efficient state so as to save energy, improve heating comfort, and improve the deficiencies of the existing carbon dioxide overlapping type heating system.

The embodiments described above are only for illustrating the technical concepts and features of the present disclosure, and are intended to make those skilled in the art being able to understand the present disclosure and thereby implement it, and should not be concluded to limit the protective scope of the present disclosure. Any equivalent variations or modifications according to the spirit of the present disclosure should be covered by the protective scope of the present disclosure.

What is claimed is:

1. A method for controlling a carbon dioxide overlapping heating system, wherein the carbon dioxide overlapping heating system comprises a low-temperature-stage loop and a high-temperature-stage loop and a heating loop, wherein the low-temperature-stage loop comprises an evaporator, a gas-liquid separator, a low-temperature-stage compressor, an intermediate heat exchanger condensing pipe, and a low-temperature-stage expansion valve which are arranged in series in the low-temperature-stage loop sequentially, wherein the high-temperature-stage loop comprises an intermediate heat exchanger evaporating pipe, a high-temperature-stage compressor, a condenser condensing pipe, and a high-temperature-stage expansion valve which are arranged in series in the high-temperature-stage loop sequentially, wherein the heating loop comprises a condenser evaporating pipe, a user-side heat exchange assembly, and a water pump which are arranged in series in the heating loop sequentially, wherein the user-side heat exchange assembly comprises a plurality of user-side heat exchange units arranged in parallel, and each user-side heat exchange unit comprises a flow control valve and a user-side heat exchanger arranged in series, wherein the intermediate heat exchanger condensing pipe and the intermediate heat exchanger evaporating pipe are arranged together to exchange heat with each other, and the condenser condensing pipe and the condenser evaporating pipe are arranged together to exchange heat with each other, and wherein the low-temperature-stage compressor and high-temperature-stage compressor are both variable-frequency compressors, and the water pump is a variable-frequency water pump, the method comprising:

1) calculating a target temperature $T_{s,i}$ of an i-th room according to room information, obtaining an outdoor temperature $T_a$ through an ambient temperature sensor, and obtaining a current indoor temperature $T_{t,i}$ of the i-th room through an indoor temperature sensor;

2) calculating an outlet temperature $T_{out}=(T_{t,1}, T_{t,2}, \ldots, T_{t,n}, T_{s,1}, T_{s,2}, \ldots, T_{s,n})$ required for a refrigerant in an outlet of a condenser according to $T_{s,i}$, $T_a$ and $T_{t,i}$, and calculating a heat load $Q_i=\phi_i(T_{t,i}, T_{s,i}, T_a)$ required for the i-th room;

3) calculating an appropriate opening degree $EXP_i=EXP_i(\Delta T_i, Q_i)$ of an i-th flow control valve according to the difference $\Delta T_i$ between the current indoor temperature $T_{t,i}$ of the i-th room and the target temperature $T_{s,i}$ of the i-th room and the heat load $Q_i$, and adjusting the flow control valve according to the numerical value of $EXP_i$.

2. The method for controlling a carbon dioxide overlapping heating system according to claim 1, further comprising:

4) calculating a heating capacity $Q=\Sigma_i^n Q_i + Q_s$ provided by a heater of the heating system according to the heat load $Q_i$ required for the i-th room and a loss of heat leakage $Q_s$ during a heating process of a user-side heat exchange unit of the plurality of user-side heat exchange unit;

5) according to the heating capacity Q provided by the heating unit and the outlet temperature $T_{out}$ required for the refrigerant at the outlet of the condenser, calculating an appropriate operating frequency $V_1 = g(Q, T_{out})$ of the high-temperature-stage compressor and an appropriate operating frequency $V_3 = h(Q, T_{out})$ of the water pump by formula:

$V_3 = h(Q, T_{out}) = 1250 \cdot Q / [Q_i^* (T_{out} - 40)]$, 6) calculating an appropriate operating frequency $V_2 = m(T_m, T_a)$ of the low-temperature-stage compressor according to a target intermediate temperature $T_m$ and the outdoor temperature $T_a$ by formula:

$$V_2 = m(T_m, T_a) = 45.27 - 0.65 \cdot T_a + 0.254 \cdot T_m - 003 \cdot T_a^2 + 0.0017 \cdot T_m^2 + 0.0019 \cdot T_a \cdot T_m;$$

wherein the units of the operating frequencies $V_1$, $V_2$, and $V_3$ are Hertz;

7) adjusting the high-temperature-stage compressor according to the numerical value of $V_1$, adjusting the low-temperature-stage compressor according to the numerical value of $V_2$, and adjusting the water pump according to the numerical value of $V_3$.

3. The method for controlling a carbon dioxide overlapping heating system according to claim 1, wherein, in step 3), when $|\Delta T_i| \le 1°$ C., the i-th flow control valve is no longer adjusted.

4. The method for controlling a carbon dioxide overlapping heating system according to claim 1, wherein the heating system further comprises the ambient temperature sensor for detecting an external ambient temperature, the indoor temperature sensor for detecting the current indoor temperature, and a refrigerant inlet temperature sensor and a refrigerant outlet temperature sensor respectively arranged at an inlet end and an outlet end of the condenser condensing pipe.

5. The method for controlling a carbon dioxide overlapping heating system according to claim 1, wherein the high-temperature-stage loop further comprises an internal heat exchanger evaporating pipe arranged between the intermediate heat exchanger condensing pipe and the high-temperature-stage compressor, and an internal heat exchanger condensing pipe arranged between the condenser evaporating pipe and the high-temperature-stage expansion valve, and the internal heat exchanger evaporating pipe and the internal heat exchanger condensing pipe are arranged together to exchange heat with each other.

6. The method for controlling a carbon dioxide overlapping heating system according to claim 1, wherein a defrosting pipeline is connected between an inlet end of the evaporator and an inlet end of the intermediate heat exchanger condensing pipe, and the defrosting pipeline is provided with a solenoid valve.

7. The method for controlling a carbon dioxide overlapping heating system according to claim 1, wherein the low-temperature-stage loop further comprises a fan for driving outdoor air to exchange heat with the evaporator, and the fan is a variable-frequency fan.

8. The method for controlling a carbon dioxide overlapping type heating system according to claim 7, wherein a controlling the operation of the fan comprises:

predetermining threshold temperatures $T_{a,1}$, $T_{a,2}$, wherein $T_{a,1} \le T_{a,2}$;

when $T_a \le T_{a,1}$, running the variable-frequency fan at an operating frequency of $V_{f,1}$;

when $T_{a,1} < T_a \le T_{a,2}$, running the variable-frequency fan at an operating frequency of $V_{f,2}$; and when $T_a > T_{a,2}$, running the variable-frequency fan at an operating frequency of $V_{f,3}$, wherein $V_{f,1} > V_{f,2} > V_{f,3}$.

9. The method for controlling a carbon dioxide overlapping type heating system according to claim 7, wherein, when $|\Delta T_i| \le 1°$ C., the i-th flow control valve is no longer adjusted;

wherein controlling the operation of the fan comprises:

predetermining threshold temperatures $T_{a,1}$, $T_{a,2}$, wherein $T_{a,1} < T_{a,2}$;

when $T_a \le T_{a,2}$, running the variable-frequency fan at an operating frequency of $V_{f,1}$;

when $T_{a,1} < T_a \le T_{a,2}$, running the variable-frequency fan at an operating frequency of $V_{f,2}$; and when $T_a > T_{a,2}$, running the variable-frequency fan at an operating frequency of $V_{f,3}$, wherein $V_{f,1} > V_{f,2} > V_{f,3}$.

* * * * *